United States Patent
Knapton et al.

(10) Patent No.: US 11,132,041 B2
(45) Date of Patent: Sep. 28, 2021

(54) POWER SUPPLY WITH MANAGEMENT INTERFACE AND METHOD THEREFOR

(71) Applicant: DELL PRODUCTS, LP, Round Rock, TX (US)

(72) Inventors: Ed Knapton, Pflugerville, TX (US); Albert Hsieh, Taipei (TW); Neo Chuang, Taipei (TW); Yc Chang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/782,851

(22) Filed: Feb. 5, 2020

(65) Prior Publication Data
US 2021/0240241 A1   Aug. 5, 2021

(51) Int. Cl.
   *G06F 1/26* (2006.01)
   *G06F 1/10* (2006.01)
   *G06F 13/40* (2006.01)

(52) U.S. Cl.
   CPC ............. *G06F 1/266* (2013.01); *G06F 1/10* (2013.01); *G06F 13/4027* (2013.01)

(58) Field of Classification Search
   CPC ......... G06F 1/10; G06F 13/4027; G06F 1/266
   See application file for complete search history.

(56) References Cited

U.S. PATENT DOCUMENTS

| | | | |
|---|---|---|---|
| 2012/0137159 A1* | 5/2012 | Chin | G06F 1/26 713/340 |
| 2013/0100568 A1* | 4/2013 | Mistry | G06F 1/24 361/103 |
| 2014/0184265 A1* | 7/2014 | Zhou | G01R 31/40 324/764.01 |
| 2018/0314318 A1* | 11/2018 | Remis | G06F 1/26 |
| 2020/0012328 A1* | 1/2020 | Sato | G06F 1/3296 |
| 2020/0033928 A1* | 1/2020 | Zhang | G06F 11/3476 |
| 2020/0097059 A1* | 3/2020 | Ou Yang | G06F 1/28 |

* cited by examiner

*Primary Examiner* — Glenn A. Auve
(74) *Attorney, Agent, or Firm* — Larson Newman, LLP

(57) ABSTRACT

An information handling system includes a power supply to provide power to the information handling system. The power supply is communicatively coupled to a baseboard management controller by a first signal interconnect and a second signal interconnect. The power supply is configured to provide, via the first signal interconnect, an alert to the BMC indicating that an operating parameter of the PSU exceeds a predetermined threshold. The first signal interconnect is associated with a PWR_OK signal of an Advanced Technology eXtended (ATX) specification and the second signal interconnect is associated with a PS_ON #signal of the ATX specification.

20 Claims, 7 Drawing Sheets

POWER SUPPLY WITH MANAGEMENT INTERFACE AND METHOD THEREFOR

FIELD OF THE DISCLOSURE

This disclosure generally relates to information handling systems, and more particularly relates to a desktop power supply unit with a power management interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a power supply to provide power to the information handling system. The power supply is communicatively coupled to a baseboard management controller by a first signal interconnect and a second signal interconnect. The power supply is configured to provide, via the first signal interconnect, an alert to the BMC indicating that an operating parameter of the PSU exceeds a predetermined threshold. The first signal interconnect is associated with a PWR_OK signal of an Advanced Technology eXtended (ATX) specification and the second signal interconnect is associated with a PS_ON #signal of the ATX specification.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
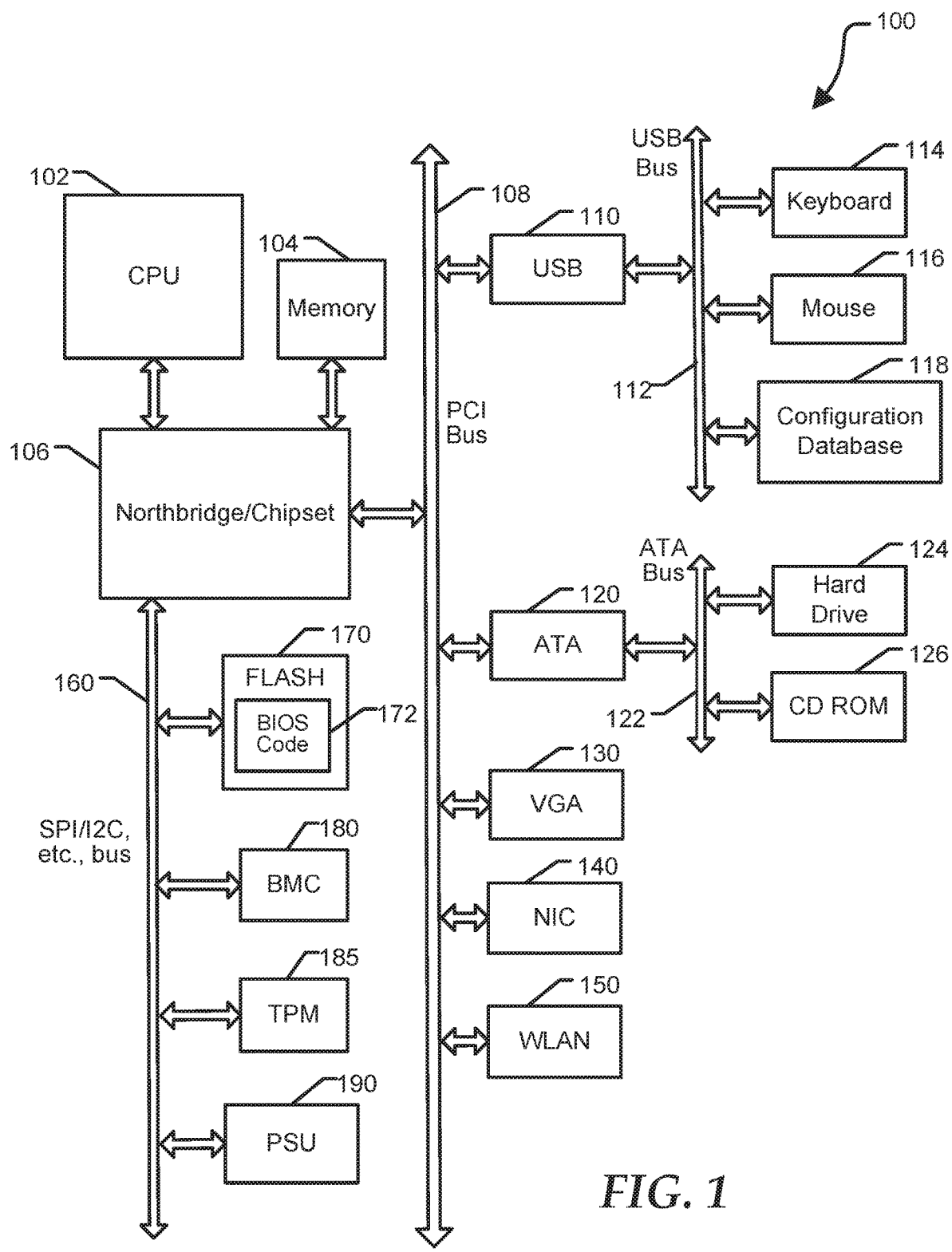
FIG. 1 is a block diagram of an information handling system according to a specific embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device 114, a mouse device controller 116, an eye-tracking device 118, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial busses 160, a NVRAM 170 for storing BIOS 172, a baseboard management controller (BMC) 180, a trusted platform module (TPM) 185, and a power supply unit (PSU) 190.

BMC 180 can be referred to as a service processor, an embedded controller (EC), and the like. BMC 180 includes a processor that can operate out-of-band with respect to CPU 102. For example, remote management systems can utilize BMC 180 to access components at information handling system independent of an operating state of CPU 102. BMC 180 may be responsible for performing low level hardware tasks including thermal management and power management operations. TPM 185 is configured to ensure that the boot process starts from a trusted combination of hardware and software, and continues until the operating system has fully booted and applications are running. TPM 185 is compliant with an international standard for a secure cryptoprocessor, a dedicated microcontroller designed to secure hardware through integrated cryptographic keys. NVRAM 170 can be referred to as a SPI flash storage device, BIOS SPI, and the like.

PSU 190 is configured to receive mains power, for example 110/220 VAC, and to provide operating power to components of information handling system, for example 12 VDC, 5 VDC, 3.3 VDC, and the like. PSU 190 can be compliant or compatible with one or more industry standards, such as the Advanced Technology eXtended (ATX) motherboard and power supply configuration specification. The ATX PSU specification defines a plurality of power connectors and corresponding voltage and signal interconnects. For example, the ATX specification defines a PS_ON #signal, which can be asserted by information handling system 100 to instruct PSU 190 to activate primary power rails at the PSU. For another example, the ATX specification defines a PWR_OK signal that is asserted by the PSU if voltage levels provided by the PSU are within an acceptable range. However, the ATX specification does not define signals to indicate that power/current demands placed on the PSU exceed product specifications, or similar information. Techniques disclosed herein utilize the PS_ON # and PWR_OK signal interconnects to provide additional capabilities while maintaining compatibility with ATX compliant information handling systems.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more busses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system, such as Windows, is loaded, computational operation of information handling system can begin.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
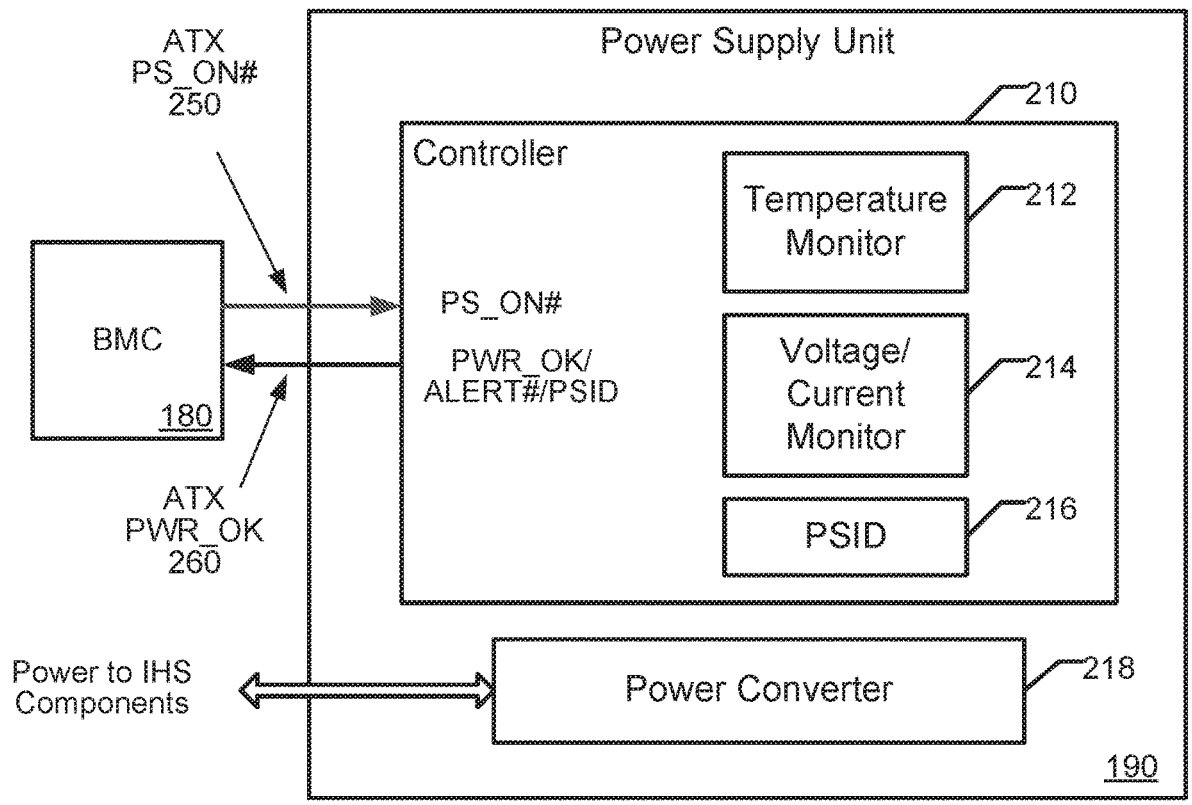
FIG. 2 is a block diagram illustrating a portion of the information handling system of FIG. 1 according to a specific embodiment of the present disclosure.

FIG. 2 shows a portion of information handling system 100 including BMC 180 and PSU 190, according to a specific embodiment of the present disclosure. PSU 190 includes a controller 210 and a power converter 220. Controller 210 includes a temperature monitoring circuit 212, a voltage/current monitoring circuit 214, and a register to store a power supply identifier (PSID) 216. PSU 190 is coupled to BCM 180 via a signal interconnect 250 corresponding to the signal PS_ON # of the ATX specification, and a signal interconnect 260 corresponding PWR_OK of the ATX specification. Power converter 220 is configured to convert mains alternating current power to direct current voltage levels needed by the various components that make up information handling system 100. In an embodiment, PSU 190 is configured to provide supplemental information via signal interconnect 260. In particular, signal interconnect 260 can be asserted to indicate that voltage levels provided by PSU 190 are good, as defined by the ATX specification, but can further be asserted by PSU 190 to alert system 100 that an anomaly has occurred. For example, temperature monitor 212 can assert a signal (ALERT #) at interconnect 260 to alert BMC 180 to an excess-temperature situation at PSU 190. Similarly, voltage/current monitor 214 can assert a signal at interconnect 260 to alert BMC 180 if current consumption by system 100 exceeds specified operating levels of PSU 190. In another embodiment, PSU 190 can utilize signal interconnect 260 to provide PSID 216 to BMC 180. Signal ALERT # can be asserted at signal interconnect 260 to indicate other anomalous operation at PSU 190, such as improper fan-speed, and the like.

Figure 3:
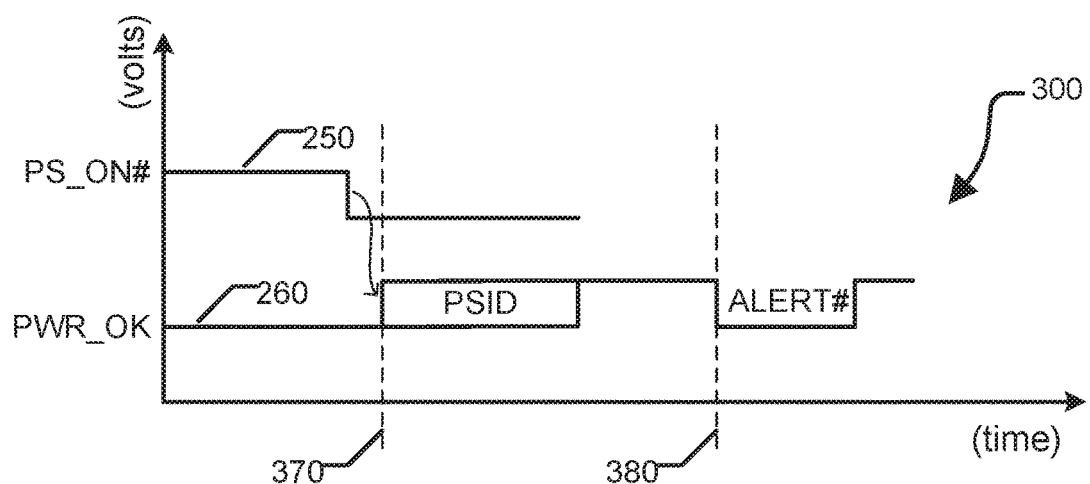
FIG. 3 is a timing diagram illustrating operation of a power supply according to a specific embodiment of the present disclosure.

FIG. 3 shows a timing diagram 300 illustrating operation of PSU 190 according to a specific embodiment of the present disclosure. Timing diagram 300 includes a vertical axis corresponding to voltage, a horizontal axis corresponding to time, and waveforms associated with signal interconnects 250 and 260. During operation, BMC 180 or another component at system 100 can assert signal PS_ON # by driving signal interconnect 250 to an active-low voltage level. In response to assertion of signal PS_ON #, PSU 190 can respond by transmitting PSID 216 as indicated at time reference 370. In another embodiment, PSU 190 can drive signal interconnect 260 to an active-low voltage level to alert BMC 180 to an anomalous situation at PSU 190. In particular, ALERT # can be asserted after a predetermined interval of time has elapsed after receiving the PS_ON # command as indicated at time reference 380, such that assertion of ALERT # is not considered to be in response to the assertion of PS_ON #.

Figure 4:
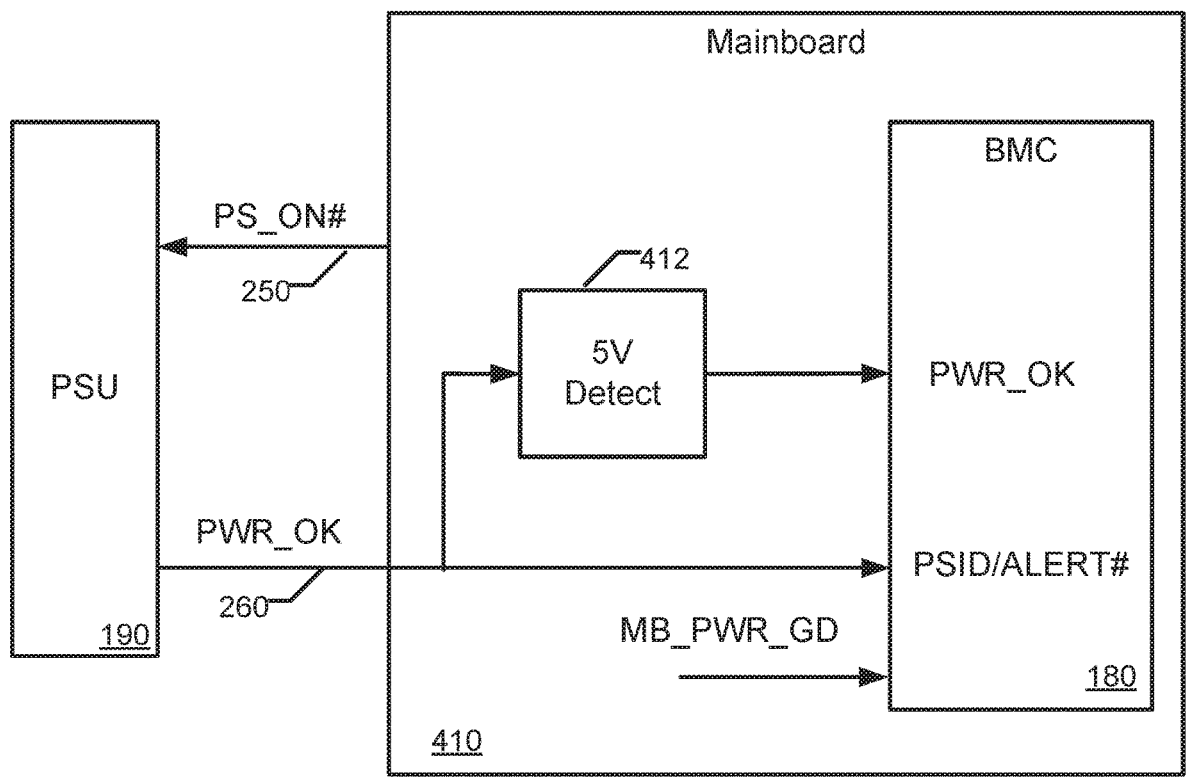
FIG. 4 is a block diagram illustrating a portion of the information handling system of FIG. 1 according to another embodiment of the present disclosure.

FIG. 4 shows a portion of information handling system 100 including PSU 190 and mainboard 410 according to another embodiment of the present disclosure. Mainboard 410 includes BMC 180 and a 5V detect circuit 412. PSU 190 is coupled to BCM 180 via a signal interconnect 250 corresponding to the signal PS_ON # of the ATX specification, and a signal interconnect 260 corresponding PWR_OK of the ATX specification. FIG. 4 illustrates one technique for differentiating between a PWR_OK and PSID provided by PSU 190. For example, PSU can drive signal interconnect to a 5V level to indicate PWR_OK, while driving signal interconnect to 3.3V to provide PSID. During operation, 5V detect circuit 412 is configured to propagate a PWR_OK indication from PSU 190 at signal interconnect 260 in response to determining that the voltage level at signal interconnect 260 is approximately 5 volts. In an embodiment, mainboard 410 can include voltage regulation and supply circuitry to provide additional voltage levels required for operation of system 100. For example, mainboard 410 can generate signal MB_PWR_GD to indicate to BMC 180 that these additional levels are good. As described above, a logic-low level at signal interconnect 260 can be interpreted by BMC 180 to indicate an alert from PSU 190. In particular, BMC 180 can be configured to recognize that an assertion of a signal at signal interconnect 260 corresponds to an alert indication because PSU 190 made the assertion outside of a PSID transaction time, for example not in response to an assertion of PS_ON #. PSU 190 is configured to provide a PSID to BMC 180 during the PSID transaction time in response to assertion of PS_ON # at signal interconnect 250 by BMC 180. One of skill will appreciate that one or more alert indications can be provided by PSU 190 using suitable encoding schemes.

Figure 5:
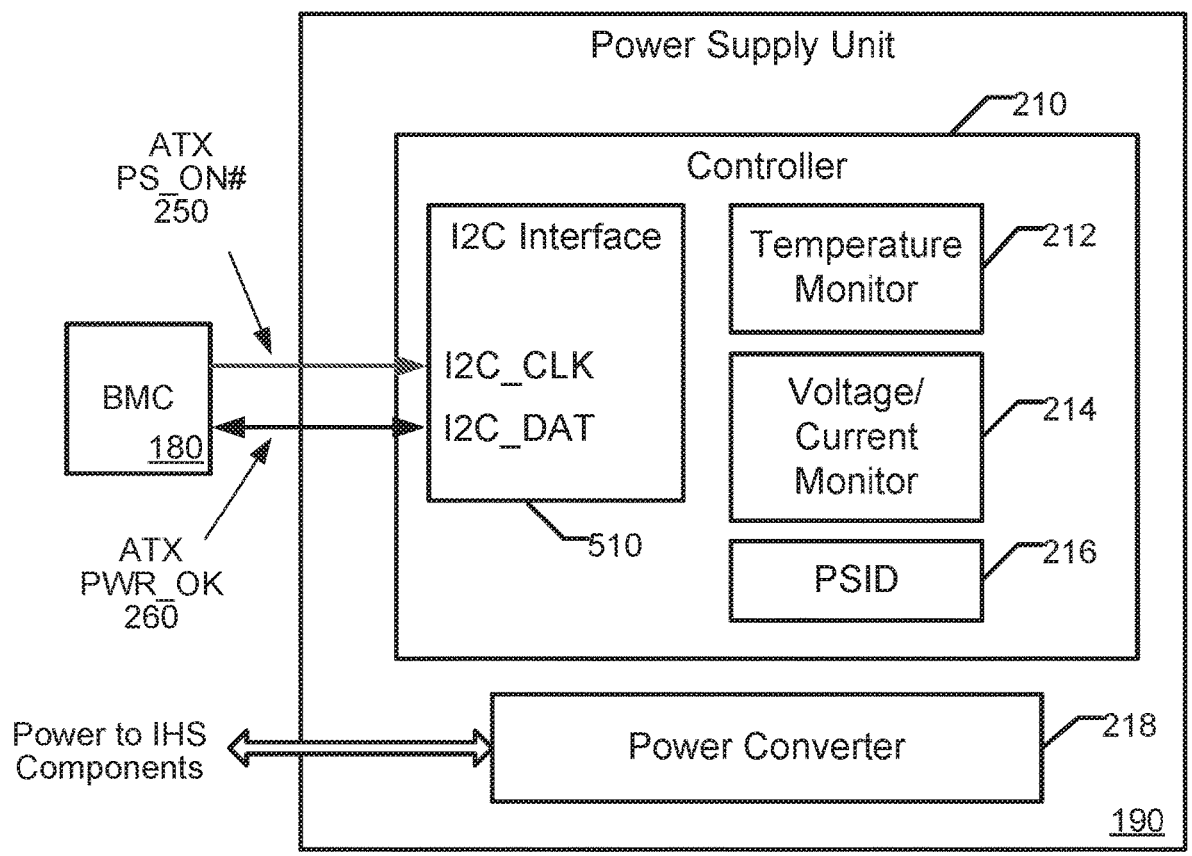
FIG. 5 is a block diagram illustrating a portion of the information handling system of FIG. 1 according to still another embodiment of the present disclosure.

FIG. 5 shows a portion of information handling system 100 including BMC 180 and PSU 190, according to still another embodiment of the present disclosure. PSU 190 includes a controller 210 and a power converter 220. Controller 210 includes a temperature monitoring circuit 212, a voltage/current monitoring circuit 214, a register to store a power supply identifier (PSID) 216, and an I2C interface circuit 510. BMC 180 includes a corresponding I2C interface circuit, not shown at FIG. 5. The I2C interface at BMC 180 is configured as a bus master, while I2C interface 510 at PSU 190 is configured as a bus slave. PSU 190 is coupled to BMC 180 via a signal interconnect 250 corresponding to the signal PS_ON # of the ATX specification, and a signal interconnect 260 corresponding PWR_OK of the ATX specification. In an embodiment, PSU 190 is configured to provide supplemental information via signal interconnects 250 and 260. In particular, signal interconnect 250 is configured to propagate an I2C clock signal (I2C_CLK) from BMC 180 to PSU controller 210 via signal interconnect 250, and signal interconnect 260 is configured to propagate I2C commands and data (I2C DAT) between BMC 180 and PSU 190.

During operation, BMC 180 is configured to send an I2C command to PSU 190 via signal interconnect 260. PSU 190 can respond to the command by sending requested data to BMC 180 via signal interconnect 260. The I2C interface at PSU 180 can be used by BMC 180 request information from PSU 190 and to configure one or more operating characteristics at PSU 180. For example, an I2C command issued by BMC 180 can include a request for PSU 190 to provide a PSID, a current operating temperature, a current level of power being provided by PSU 190, and the like. Also, an I2C command generated by BMC 180 can be a request for PSU 190 to adjust a fan speed, enable or disable one or more power rails, adjust alert thresholds associated with temperature monitor 212 and voltage/current monitor 214, and the like. In addition, BMC 180 can use the I2C interface to send data to PSU 190. In an embodiment, signal I2C_CLK can be defined to be an active-low signal to maintain backwards compatibility with the ATX specification. For example, an active-low assertion at signal interconnect 250 by BMC 180 can be interpreted as a PS_ON # request by a legacy ATX PSU that does not include I2C interface 510.

Figure 6:
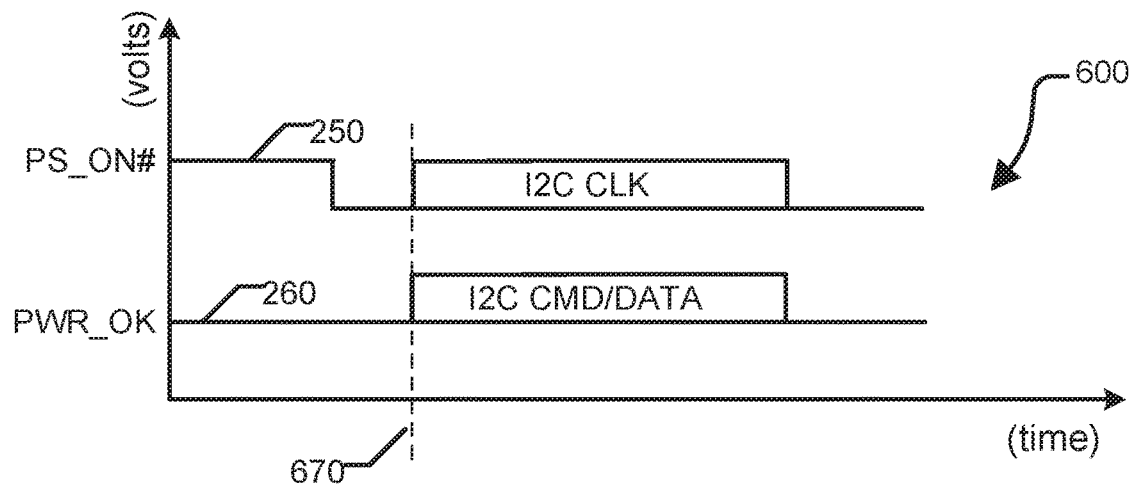
FIG. 6 is a timing diagram illustrating operation of a power supply according to another embodiment of the present disclosure.

FIG. 6 shows a timing diagram 600 illustrating operation of PSU 190 according to a specific embodiment of the present disclosure. Timing diagram 600 includes a vertical axis corresponding to voltage, a horizontal axis corresponding to time, and waveforms associated with signal interconnect 250 and 260. Timing diagram 600 further includes a time reference 670 corresponding to transmission of signal I2C_CLK via signal interconnect 250 and transmission of corresponding I2C command/data via signal interconnect 260. An initial active-low assertion at signal interconnect 250 may be interpreted by PSU 190 as PS_ON # indicating a request to activate power rail(s). The assertion of PS_ON # may optionally be interpreted as a request by BMC 180 for PSID 216. Furthermore, PSU 190 can be configured to provide signal ALERT # to BMC 180 as described above. For example, PSID transactions may be recognized immediately after power-on/resume at system 100, while I2C transactions can be recognized at any time in response to reception of signal I2C_CLK at signal interconnect 250.

Figure 7:
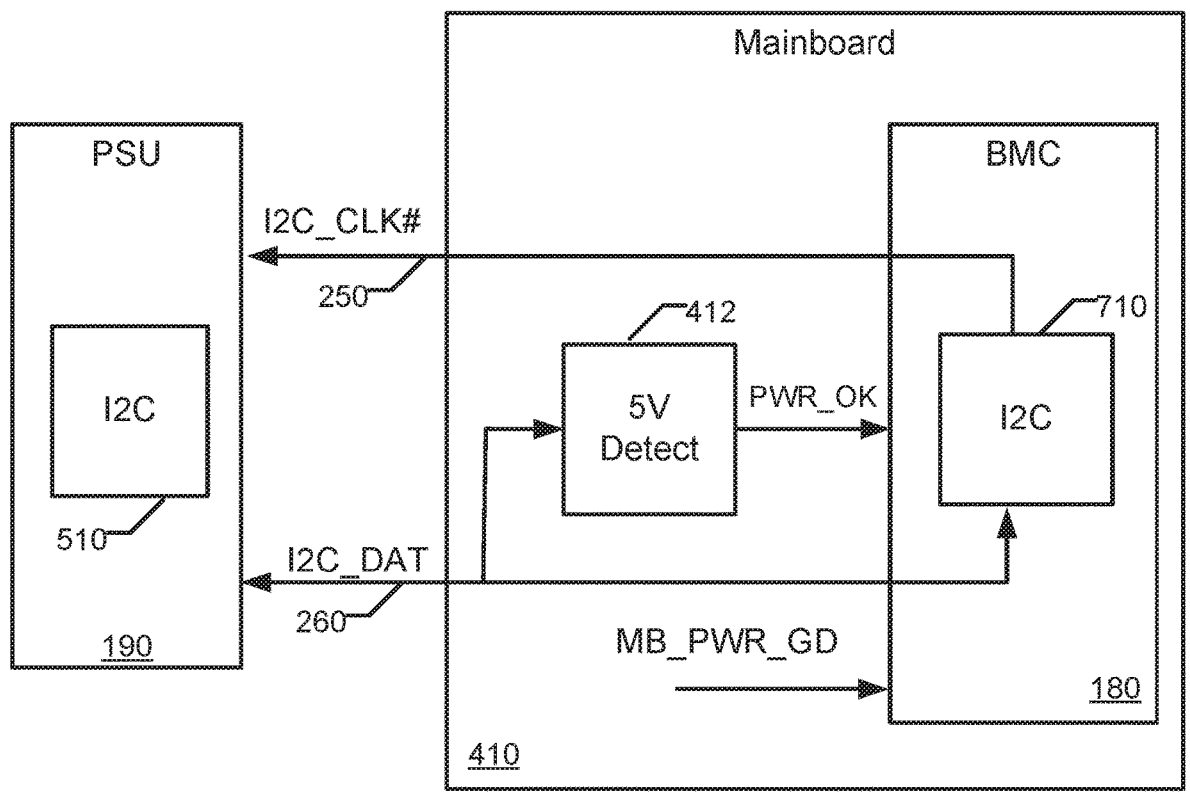
FIG. 7 is a block diagram illustrating a portion of the information handling system of FIG. 1 according to yet another embodiment of the present disclosure.

FIG. 7 shows a portion of information handling system 100 including PSU 190 and mainboard 410 according to another embodiment of the present disclosure. Mainboard 410 includes BMC 180 and a 5V detect circuit 412. PSU 190 is coupled to BMC 180 via a signal interconnect 250 corresponding to the signal PS_ON # of the ATX specification, and a signal interconnect 260 corresponding PWR_OK of the ATX specification. PSU 190 includes an I2C interface circuit 510 and BMC 180 includes an I2C interface circuit 710. FIG. 7 illustrates how BMC 180 can support power supplies having I2C capabilities, while also supporting power supplies having PSID and ALERT # capabilities and default ATX PWR_OK functionality.

Figure 8:
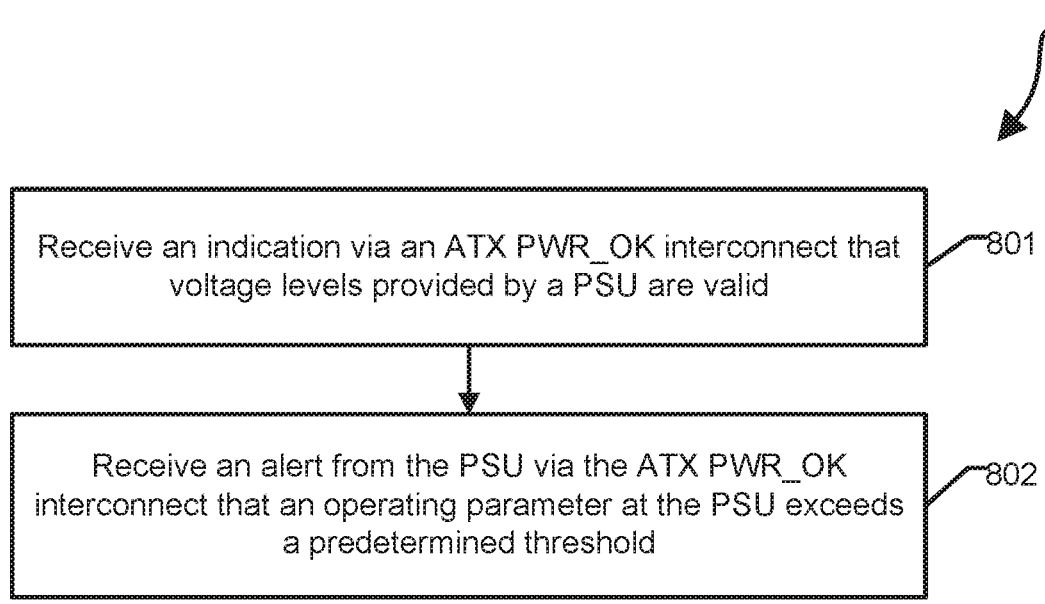
FIG. 8 is a flow diagram illustrating a method for communicating an alert signal from a power supply unit to a baseboard management controller according to a specific embodiment of the present disclosure.

FIG. 8 shows a method 800 for communicating an alert signal from a PSU to a BMC according to a specific embodiment of the present disclosure. Method 800 begins at block 801 where an indication is received from a PSU via an ATX PWR_OK signal interconnect that voltage levels provided by a PSU are valid. For example, a legacy PSU that is compliant with an ATX specification can assert signal PWR_OK in response to receiving a PS_ON # command from information handling system 100. Method 800 completes at block 802 where an alert notification is received from the PSU via the ATX PWR_OK interconnect, the notification to inform the BMC that an operating parameter at the PSU exceeds a predetermined threshold. For example, BMC 180 can recognize that PSU 190 has provided signal ALERT # via the ATX PWR_OK signal interconnect.

Figure 9:
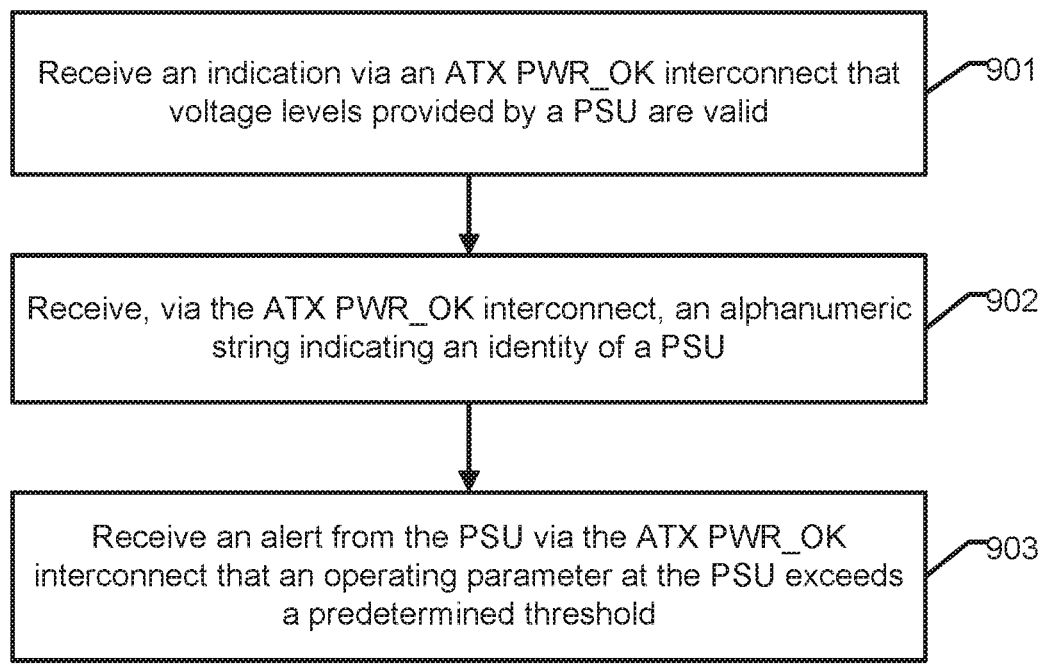
FIG. 9 is a flow diagram illustrating a method for communicating a power supply unit identifier from a power supply unit to a baseboard management controller according to a specific embodiment of the present disclosure.

FIG. 9 shows a method 900 for communicating a PSU identifier from a PSU to a BMC according to a specific embodiment of the present disclosure. Method 900 begins at block 901 where an indication is received at a BMC via an ATX PWR_OK interconnect that voltage levels provided by a PSU are valid. For example, a legacy PSU that is compliant with an ATX specification can assert signal PWR_OK in response to receiving a PS_ON # command from information handling system 100. Method 900 continues at block 902 where an alphanumeric string indicating an identity of a PSU is received via the ATX PWR_OK interconnect. For example, PSU 190 can serially transmit a PSID stored at register 216 to BMC 180 in response to receiving a PS_ON # command from BMC 180. Method 900 completes at block 903 where an alert can be received from the PSU, via the ATX PWR_OK interconnect, that an operating parameter at the PSU exceeds a predetermined threshold, as described above with reference to method 800.

Figure 10:
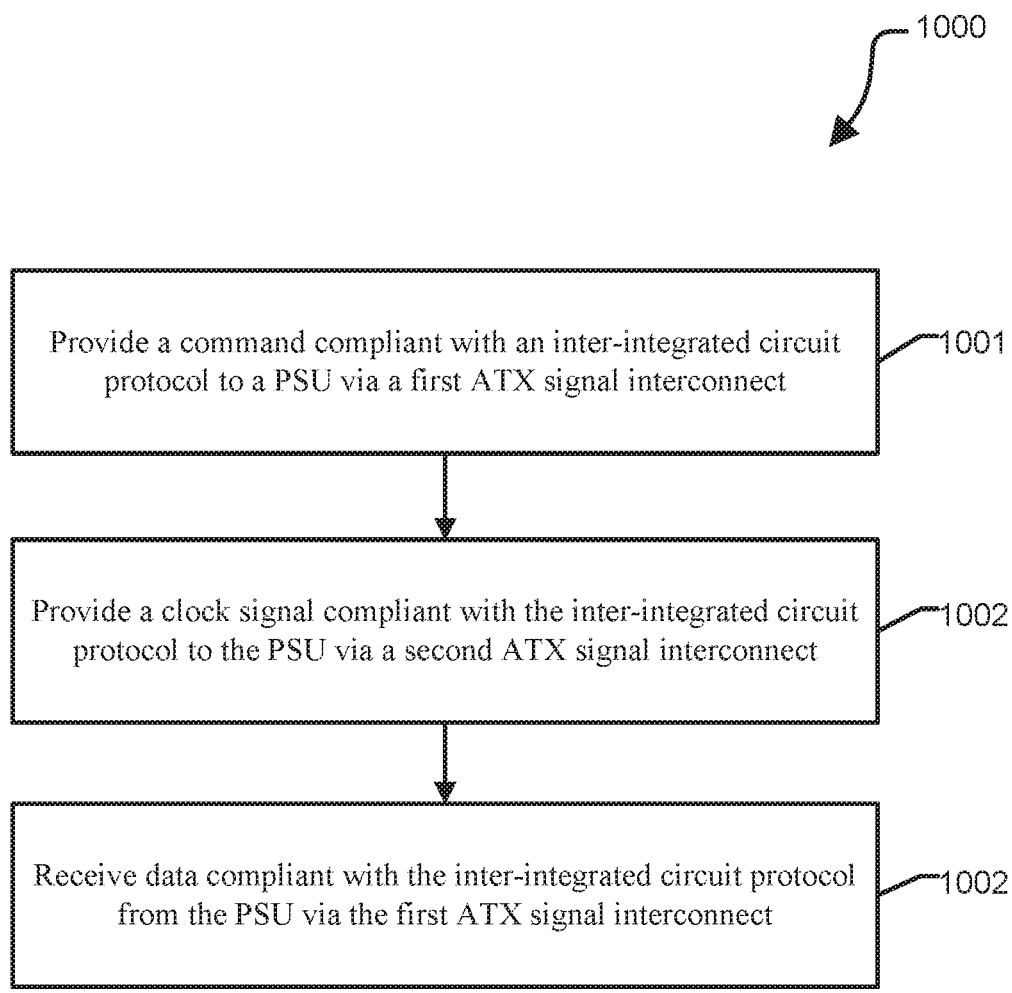
FIG. 10 is a flow diagram illustrating a method for communicating information between a baseboard management controller and a power supply unit according to a specific embodiment of the present disclosure.

FIG. 10 shows a method 1000 for communicating information between a BMC and a PSU according to a specific embodiment of the present disclosure. Method 1000 begins at block 1001 where a command compliant with an inter-integrated circuit protocol is provided to a PSU via a first ATX signal interconnect. For example, BMC can transmit an I2C command to PSU 190 via an ATX PWR_OK signal interconnect. Method 1000 continues at block 1002 where a clock signal compliant with the inter-integrated circuit protocol is provided to the PSU via a second ATX signal interconnect. For example, BMC 180 can transmit signal I2C_CLK # to OSU 190 via an ATX PS_ON #signal interconnect. Method 1000 completes at block 1003 where data compliant with the inter-integrated circuit protocol can be received from the PSU via the first ATX signal interconnect. For example, PSU 190 can respond to an I2C command requesting information by transmitting the data to BMC 180 via the ATX PWR_OK signal interconnect. Similarly, PSU 190 can receive data from BMC 180 via the ATX PWR_OK signal interconnect using the I2C interface.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a baseboard management controller (BMC); and
    a power supply unit (PSU) to provide power to the information handling system, the PSU communicatively coupled to the BMC by a first signal interconnect and a second signal interconnect, the PSU configured to provide, via the first signal interconnect, an alert to the BMC indicating that an operating parameter of the PSU exceeds a predetermined threshold,
    wherein the first signal interconnect is associated with a PWR_OK signal of an Advanced Technology eXtended (ATX) specification and the second signal interconnect is associated with a PS_ON #signal of the ATX specification.

2. The information handling system of claim 1, wherein the first signal interconnect is operable to propagate commands and data compliant with an inter-integrated circuit protocol.

3. The information handling system of claim 2, wherein the second signal interconnect is operable to propagate a clock signal compliant with the inter-integrated circuit protocol.

4. The information handling system of claim 1, wherein the PSU is further configured to provide to the BMC, via the first signal interconnect, an alphanumeric string indicating an identity of the PSU, the providing in response to assertion of a signal at the second signal interconnect by the BMC.

5. The information handling system of claim 1, wherein the operating parameter comprises a current consumption at a first output voltage rail of the PSU.

6. The information handling system of claim 1, wherein the operating parameter comprises a temperature at the PSU.

7. The information handling system of claim 1, wherein the BMC is configured to provide, via the second signal interconnect, a request to the PSU to activate a primary power rail at the PSU.

8. An information handling system comprising:
    a power supply (PSU) to provide power to the information handling system; and
    a baseboard management controller (BMC), the BMC communicatively coupled to the PSU by a first signal interconnect and a second signal interconnect, the BMC configured to receive, via the first signal interconnect, an alert from the PSU indicating that an operating parameter of the PSU exceeds a predetermined threshold,
    wherein the first signal interconnect is associated with a PWR_OK signal of an Advanced Technology eXtended (ATX) specification and the second signal interconnect is associated with a PS_ON #signal of the ATX specification.

9. The information handling system of claim 8, wherein the first signal interconnect is operable to propagate commands and data compliant with an inter-integrated circuit protocol.

10. The information handling system of claim 9, wherein the second signal interconnect is operable to propagate a clock signal compliant with the inter-integrated circuit protocol.

11. The information handling system of claim 8, wherein the BMC is further configured to receive from the BMC PSU, via the first signal interconnect, an alphanumeric string indicating an identity of the PSU, the receiving in response to assertion of a signal at the second signal interconnect by the BMC.

12. The information handling system of claim 8, wherein the operating parameter comprises a current consumption at a first output voltage rail of the PSU.

13. The information handling system of claim 8, wherein the operating parameter comprises a temperature at the PSU.

14. The information handling system of claim 8, wherein the BMC is further configured to provide, via the second signal interconnect, a request to the PSU to activate a primary power rail at the PSU.

15. A method comprising:
    receiving at a baseboard management controller (BMC), via a first signal interconnect communicatively coupling a power supply unit (PSU) to the BMC, an indication from the PSU that voltage levels provided by the PSU are valid; and
    receiving at the BMC, via the first signal interconnect, an alert from the PSU indicating that an operating parameter of the PSU exceeds a predetermined threshold,
    wherein the first signal interconnect is associated with a PWR_OK signal of an Advanced Technology eXtended (ATX) specification.

16. The method of claim 15, further comprising:
    receiving at the BMC, via the first signal interconnect, an alphanumeric string indicating an identity of the PSU in response to assertion of a signal at a second signal interconnect by the BMC, the second signal interconnect associated with a PS_ON # signal of the ATX specification.

17. The method of claim 16, further comprising:
    providing to the PSU, via the second signal interconnect, a clock signal compliant with the inter-integrated circuit protocol.

18. The method of claim 15, further comprising:
providing to the PSU, via the first signal interconnect, a command compliant with an inter-integrated circuit protocol; and
receiving at the BMC, via the first signal interconnect, data compliant with the inter-integrated circuit protocol.

19. The method of claim 15, wherein the operating parameter comprises a current consumption at a first output voltage rail of the PSU.

20. The method of claim 15, wherein the operating parameter comprises a temperature at the PSU.

* * * * *

UNITED STATES PATENT AND TRADEMARK OFFICE
CERTIFICATE OF CORRECTION

PATENT NO. : 11,132,041 B2  Page 1 of 1
APPLICATION NO. : 16/782851
DATED : September 28, 2021
INVENTOR(S) : Ed Knapton et al.

It is certified that error appears in the above-identified patent and that said Letters Patent is hereby corrected as shown below:

In the Claims

Column 9, Line 50: Please change "PS_ON #signal" to --PS_ON# signal--

Column 10, Line 20: Please change "PS_ON #signal" to --PS_ON# signal--

Column 10, Lines 31-32: Please change "from the BMC PSU" to --from the PSU--

Column 10, Line 62: Please change "PS_ON # signal" to --PS_ON# signal--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*